(12) United States Patent
Chin et al.

(10) Patent No.: US 7,967,312 B2
(45) Date of Patent: *Jun. 28, 2011

(54) DUAL RIDING AND DRIVING TRICYCLE IN JUXTAPOSING LINK

(76) Inventors: Hsu Sheng Chin, Kaohsiung (TW); Tsung Lin Fan Chiang, Tainan County (TW); Chih Ching Chin, Kaohsiung (TW)

( * ) Notice: Subject to any disclaimer, the term of this patent is extended or adjusted under 35 U.S.C. 154(b) by 123 days.

This patent is subject to a terminal disclaimer.

(21) Appl. No.: 12/312,684

(22) PCT Filed: Jun. 10, 2008

(86) PCT No.: PCT/CN2008/071250
§ 371 (c)(1),
(2), (4) Date: May 22, 2009

(87) PCT Pub. No.: WO2009/149598
PCT Pub. Date: Dec. 17, 2009

(65) Prior Publication Data
US 2010/0314852 A1    Dec. 16, 2010

(51) Int. Cl.
*B62K 13/06* (2006.01)
(52) U.S. Cl. .................................. 280/209; 280/7.16
(58) Field of Classification Search ............ 280/209, 280/7.16, 292, 204, 231
See application file for complete search history.

(56) References Cited

U.S. PATENT DOCUMENTS

| | | | |
|---|---|---|---|
| 469,722 A * | 3/1892 | Riess | 280/209 |
| 603,501 A * | 5/1898 | Ellar | 280/209 |
| 616,407 A * | 12/1898 | Cottrell et al. | 280/209 |
| 676,535 A * | 6/1901 | Elliott | 280/209 |
| 3,175,843 A | 3/1965 | Burke | |
| 3,350,115 A | 10/1967 | Ferrary | |
| 3,865,401 A | 2/1975 | Kingsly | |
| 3,902,738 A | 9/1975 | Gandrud | |
| 4,290,620 A | 9/1981 | Chika | |
| 5,511,809 A | 4/1996 | Sagi | |
| 5,716,065 A | 2/1998 | Liu | |
| 6,022,036 A | 2/2000 | Chartrand | |
| 6,068,278 A | 5/2000 | Kock et al. | |
| 6,170,844 B1 | 1/2001 | Sasi | |
| 6,554,308 B2 | 4/2003 | Black | |
| 6,666,468 B2 | 12/2003 | McCandless | |
| 7,669,868 B2 * | 3/2010 | Underhaug | 280/204 |
| 2004/0144585 A1 | 7/2004 | Vasser | |

FOREIGN PATENT DOCUMENTS

| | | |
|---|---|---|
| CN | 87205101 U | 8/1988 |
| CN | 2058159 U | 6/1990 |
| CN | 2565733 Y | 8/2003 |
| CN | 2691994 Y | 4/2005 |

* cited by examiner

Primary Examiner — Tony H. Winner
(74) Attorney, Agent, or Firm — Bacon & Thomas, PLLC

(57) ABSTRACT

The present invention provides a dual riding and driving tricycle in juxtaposing link, particularly for one that can be pedaled by two drivers in side-by-side coordination manner so that the drivers and tricycle will incline integrally without tumbling or overturning possibility; The main feature is that at least one articulation mechanism and a resilient tension mechanism are disposed between the primary bicycle body and auxiliary cycle body, wherein, said articulation mechanism serves in synergy an articulation parallelogram while said resilient tension mechanism counteract the deformation of the articulation mechanism to resume the stable equilibrium so that the integral of the primary bicycle body and auxiliary cycle body can automatically maintain harmonic coordination and stability when driving over bumpy road or corner turn.

11 Claims, 10 Drawing Sheets

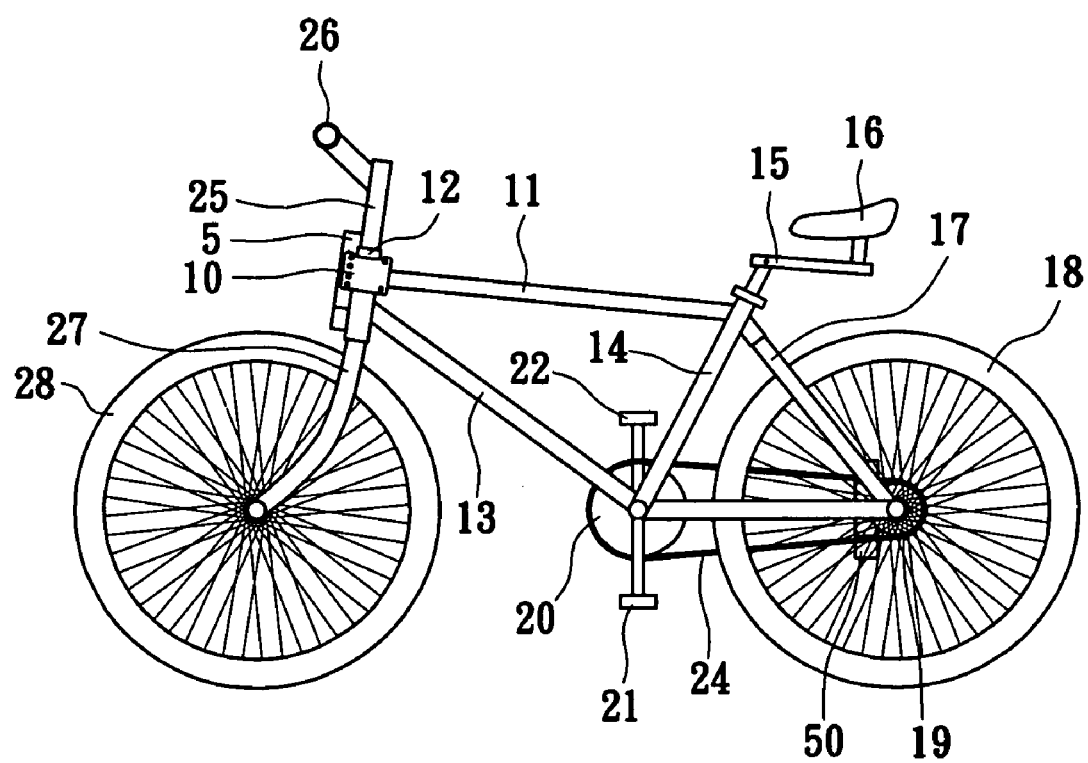
F I G . 2

(A-A)

(B-B)

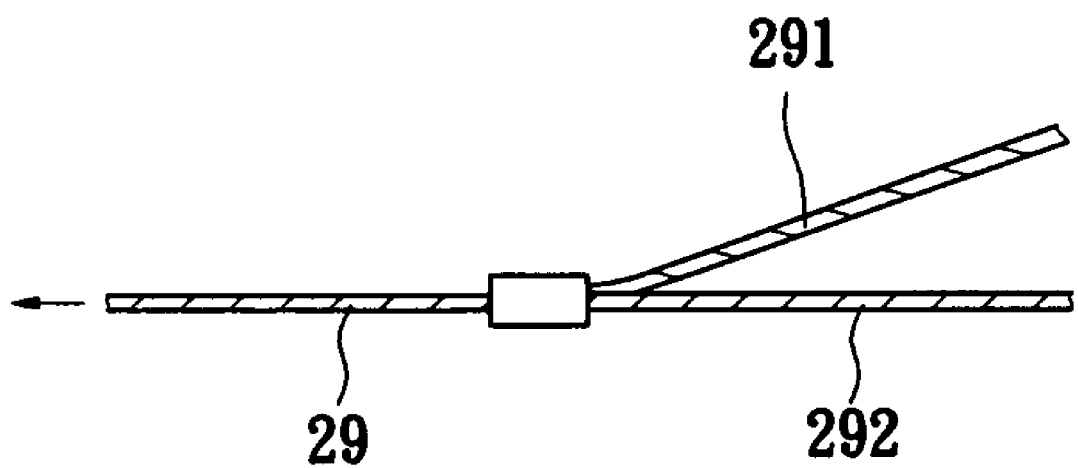
F I G . 10

(C-C)

DUAL RIDING AND DRIVING TRICYCLE IN JUXTAPOSING LINK

BACKGROUND OF THE INVENTION

1. Technical Field of the Invention

The present invention relates to a dual riding and driving tricycle in juxtaposing link, particularly for one that can be pedaled by two drivers in side-by-side coordination manner so that the drivers and tricycle will incline integrally without tumbling or overturning possibility.

2. Prior Arts of the Invention

Generally speaking, the bicycle is a kind of very popular transportation means of manpower type. It is all well-known that bicycle is totally unstable when standstill, which must rely on the foot of the rider to maintain the equilibrium. Upon driving turns, inertia makes the bicycle body keep advance along the original direction. If weight center is too high, bicycle speed is too fast or too urgent during turn, even friction force is enough to offer the necessary centripetal force, the centrifugal moment may make the bicycle body rotate and overturn. When bicycle performs turn, by inclination of driver body and bicycle body, the reversed moment can be created to reduce the centrifugal moment, which may cause the bicycle overturn outwards. Basing on this principle and phenomenon, bicycle is naturally more stable during driving advance comparing with the tricycle or four-wheeled vehicle.

Currently, one kind dual-riding bicycle of tandem type already exists in the market. However, two driver saddles of tandem bicycle are arranged in one-after-another manner instead of side-by-side manner; Just like the conventional bicycle, the tandem bicycle must rely on the foot of the rider to maintain the equilibrium when standstill.

Additionally, another kind dual-riding bicycle of parallel type also already exists in the market. However, the structure of parallel dual-riding bicycle is linked of two independent bicycles by a fixing rod, which results in awkward action during high speed or corner turn; if it is forced to drive in high speed, sharp turn or in passing over bumpy road, the parallel dual-riding bicycles may overturn. Thus, it is only good for children in learning walk. Having realized and addressed all the foregoing issues as well as sensed the promotion in recreation effect for the dual riding and driving bicycle, the applicant of the present invention paid utmost attention in research and development for a long term. Eventually, the dual riding and driving tricycle in juxtaposing link of the present invention is successfully contrived out.

SUMMARY OF THE INVENTION

The primary object of the present invention is to provide a dual riding and driving tricycle in juxtaposing link, which can be driven by the two drivers pedaling in side-by side manner.

The other object of the present invention is to provide a dual riding and driving tricycle in juxtaposing link, which not only can keep stable without tumbling or overturning possibility during passing over bumpy road or corner turn but also can naturally keep in stand well without driver's foot to support in assistance manner when in standstill state.

In order to accomplish the objects aforesaid, the solution of the present invention is to work out a dual riding and driving tricycle in juxtaposing link comprising a primary bicycle body, an auxiliary cycle body, at least one articulation mechanism and a resilient tension mechanism, wherein:

Said primary bicycle body comprises a cross top bar, a head sleeve tube, a down bar, an upright seat bar and a front stem, which is inserted said head sleeve tube therein and connected with an upper steering handle and a lower front folk together with a front wheel; Disposed pivotally in a lower joint of the down bar and upright seat bar are a front sprocket wheel and a pair of pedals, meanwhile a rear sprocket wheel is disposed pivotally in hub of rear wheel so that both of the front sprocket wheel and rear sprocket wheel are linked by a chain in engagement manner; An adjustable extended bar with a saddle at its end is inserted in the upright seat bar, which backwardly connects a rear folk together with a rear wheel at the lower end of the rear folk; On each end of the upper handle, a brake lever for rear wheel and another brake lever for front wheel are disposed thereon respectively;

Said auxiliary cycle body has a cross top bar, a head sleeve tube, a down bar, a front stem, which is inserted in the head sleeve tube and connected with a holding handle, an extended bar with a saddle being inserted an upright seat bar therein, a rear folk with a rear wheel and a pair of pedals as well as a front sprocket wheel and a rear sprocket wheel being engaged by a chain;

Said articulation mechanism comprises a first linking terminal for jointing with the primary bicycle body, a second linking terminal for jointing with the auxiliary cycle body and a pair of parallel linking rods such that all four components of the first linking terminal, second linking terminal and two parallel linking rods construct a parallelogram articulation; and Said resilient tension mechanism comprises at least two elastic elements such that both ends of each said elastic element are connected to aforesaid articulation mechanism respectively.

Wherein, an linking mount is formed respectively for each of the first linking terminal and second linking terminal, wherein, a single holding base with its holding cavity is individually disposed on each top and lower section sides thereof in opposed facing manner; For each pair of directly facing holding cavities of the holding bases, a pair of parallel linking rods are pivoted therein in parallel manner; Thus, the two linking mounts and two parallel linking rods construct a movable parallelogram articulation.

Each of said two elastic elements is individually disposed at each different side of both sides for the two parallel linking rods, wherein both ends of one elastic element are respectively connected to the positioning hole in the upper holding base of the linking mount for the first linking terminal and the positioning hole in the lower holding base of linking mount for the second linking terminal while both ends of another elastic element are respectively connected to the positioning hole in the lower holding base of the linking mount for the first linking terminal and the positioning hole in the upper holding base of linking mount for the second linking terminal.

Said elastic elements are strong springs of alternative different high elasticity coefficients.

A front articulation mechanism, which has a first linking terminal and a second linking terminal at its each end respectively, is disposed therein such that said first linking terminal is securely fixed on a position between the front wheel and rear wheel of the primary bicycle body meanwhile said second linking terminal is securely fixed on a front position of the auxiliary cycle body.

A rear articulation mechanism, which also has a first linking terminal and a second linking terminal at its each end respectively, is further disposed therein such that said first linking terminal is securely fixed on the primary bicycle body meanwhile said second linking terminal is securely fixed on the auxiliary cycle body.

Said first linking terminal and second linking terminal of the rear articulation mechanism is respectively linked and securely fixed on hub of the rear wheel for the primary bicycle body and auxiliary cycle body individually.

A top plate and two side panels are further disposed on said articulation mechanism such that only one end of the top plate is fixed on the first linking terminal of the articulation mechanism while another end of the top plate is free of any fixation with the second linking terminal of the articulation mechanism; Each top edge of said two side panels is fixed on each lateral side of the top plate so that a hollow space is created therein for accommodating the parallel linking rods of the articulation mechanism and the elastic elements of the resilient tension mechanism.

The alternative solution of the present invention is to work out another modified dual riding and driving tricycle in juxtaposing link comprising a primary bicycle body, an auxiliary cycle body, at least one articulation mechanism and a resilient tension mechanism, wherein:

Said primary bicycle body comprises a cross top bar, a head sleeve tube, a down bar, an upright seat bar and a front stem, which is inserted said head sleeve tube therein and connected with an upper steering handle and a lower front folk together with a front wheel; Disposed pivotally in a lower joint of the down bar and upright seat bar are a front sprocket wheel and a pair of pedals, meanwhile a rear sprocket wheel is disposed pivotally in hub of rear wheel so that both of the front sprocket wheel and rear sprocket wheel are linked by a chain in engagement manner; An adjustable extended bar with a saddle at its end is inserted in the upright seat bar, which backwardly connects a rear folk together with a rear wheel at the lower end of the rear folk; On each end of the upper handle, a brake lever for rear wheel and another brake lever for front wheel are disposed thereon respectively;

Said auxiliary cycle body has a cross top bar, a head sleeve tube, a down bar, a front stem, which is inserted in the head sleeve tube and connected with a holding handle, an extended bar with a saddle being inserted an upright seat bar therein, a rear folk with a rear wheel and a pair of pedals as well as a front sprocket wheel and a rear sprocket wheel being engaged by a chain;

Said articulation mechanism comprises a first linking terminal for jointing with the primary bicycle body, a second linking terminal for jointing with the auxiliary cycle body and a pair of parallel trough linking steel beams such that all four components of the first linking terminal, second linking terminal and two parallel trough linking steel beams construct a parallelogram articulation; and Said resilient tension mechanism comprises at least two elastic elements such that both ends of each said elastic element are connected to aforesaid articulation mechanism respectively.

Wherein, each of said pair of parallel trough linking steel beams is formed into ⊓-shaped transverse cross section; Both ends of each said pair of parallel trough linking steel beams are securely fixed on the first linking terminal and second linking terminal individually; A mount serving as first linking terminal for jointing with the primary bicycle body, another mount serving as second linking terminal for jointing with the auxiliary cycle body; Thus, the two mounts and two parallel trough linking steel beams construct a movable parallelogram articulation.

Plural even-spaced positioning holes are created in both lateral sides of the trough linking steel beams; For each side of the trough linking steel beams, plural springs in array are selectively clasped thereto by end hooks in different diagonal manner so that each spring arrays on both sides of the trough linking steel beams are arranged in manner of diagonally and separately crossing each other.

After having adopted the solutions aforesaid, the dual riding and driving tricycle in juxtaposing link can be used by two drivers in side-by-side manner.

A resilient tension mechanism is disposed between the first linking terminal and the second linking terminal of the articulation mechanism to counteract the deformation of the articulation mechanism so that the stability of the integral tricycle can be maintained without any tumbling or overturning possibility.

The movement confinement of the parallel linking rods limited by the cambered confining ends on the holding cavity not only make both of the auxiliary cycle body and primary bicycle body in automatically balanced coordination but also prevent the tricycle of the present invention from overturning or tumbling.

During passing over an uneven and ragged road or corner turn, the parallelogram articulation mechanism make the driver and the tricycle incline in parallel manner to keep balance so that the stability of the integral tricycle can be further maintained without any tumbling or overturning possibility.

During in standstill state, the integral tricycle can naturally keep in stand well without driver's foot to support in assistance manner as its three wheels construct a stable triangular base on the ground.

The other objects, advantages and features of the present invention can be understood by the detailed description of the following exemplary preferred embodiments together with associated drawings.

BRIEF DESCRIPTION OF THE DRAWINGS

FIG. 2 is the left lateral view of the FIG. 1 for the present invention.

FIG. 10 is the schematic view showing the rear wheel brake wire having two shunt brake wires for the present invention.

DETAILED DESCRIPTION OF THE PREFERRED EMBODIMENTS

Figure 1:
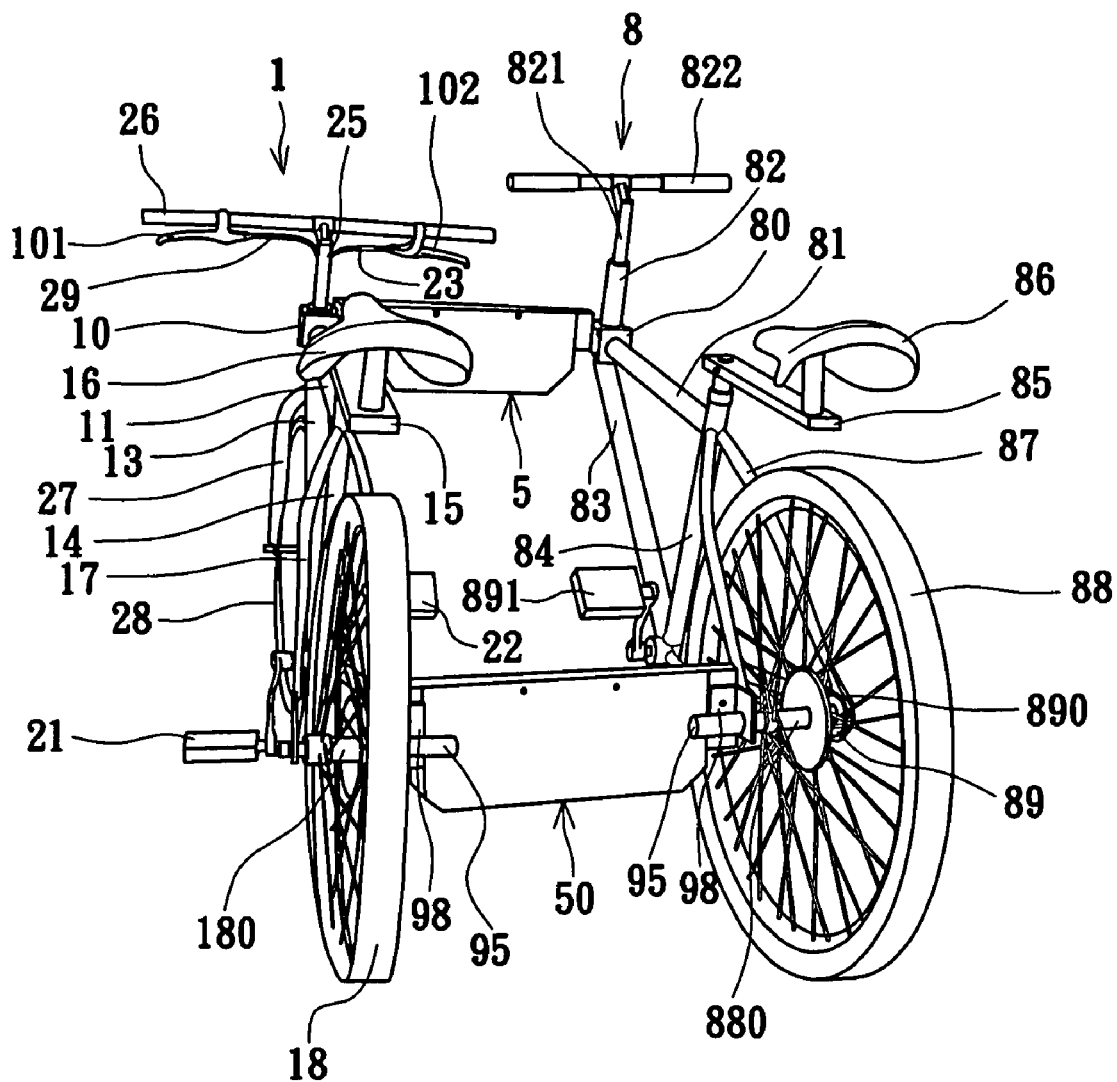
FIG. 1 is the perspective schematic view for the present invention.

Please firstly refer to FIGS. 1 and 2, which are the perspective views showing the exemplary preferred embodiment for the dual riding and driving tricycle in juxtaposing link of the present invention.

Figure 3:
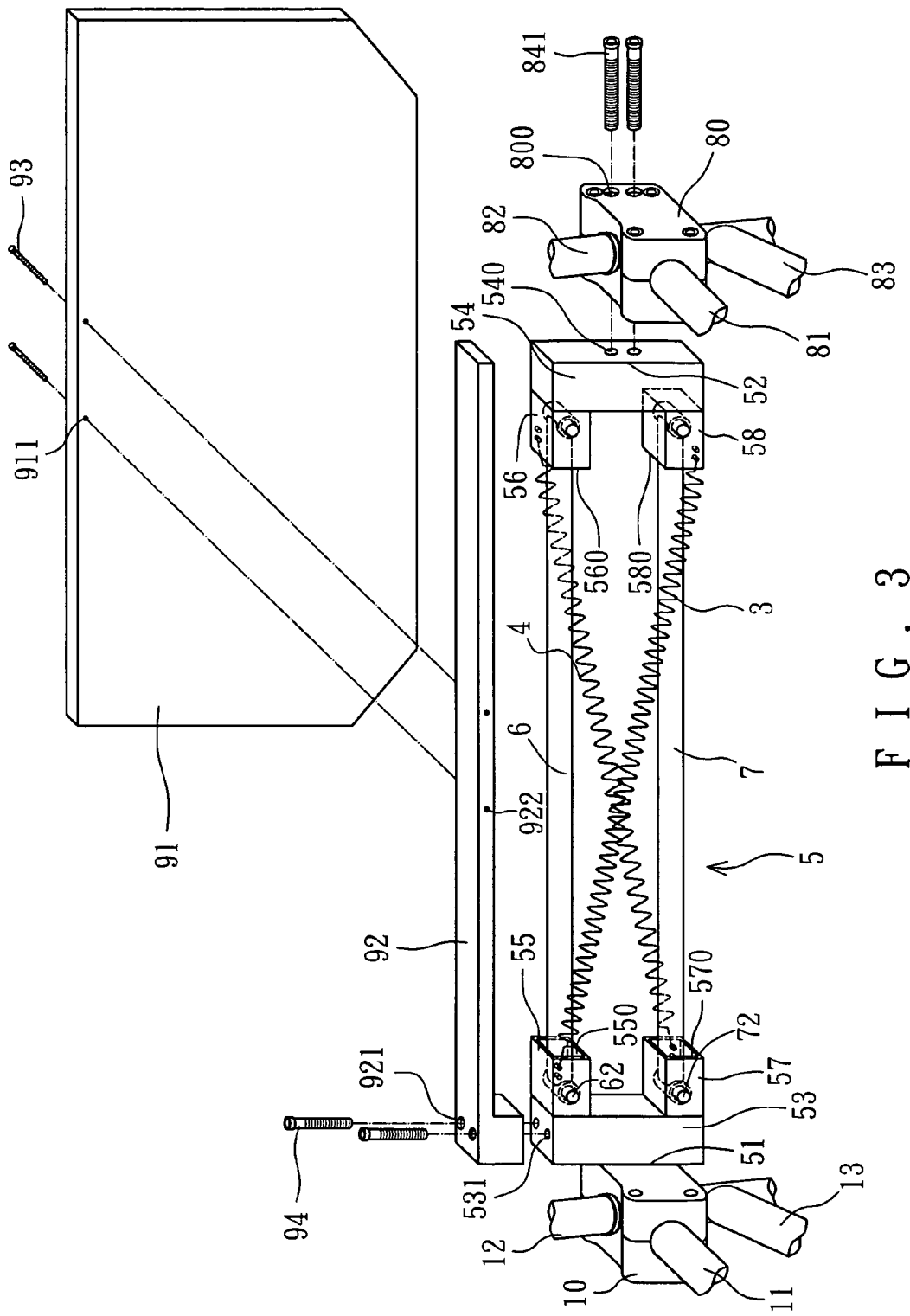
FIG. 3 is the exploded structural view of the articulation mechanism for the present invention.

The dual riding and driving tricycle in juxtaposing link of the present invention comprises a primary bicycle body 1, an auxiliary cycle body 8, at least one articulation mechanism 5 (here only one front articulation mechanism 5 and one rear articulation mechanism 50 are presented for simplicity) and a resilient tension mechanism, wherein, a saddle 16 on the primary bicycle body 1 and another saddle 86 on the auxiliary cycle body 8 are arranged in parallel side-by-side juxtaposition instead of one behind another tandem state;

Said primary bicycle body 1 comprises a cross top bar 11, a head sleeve tube 12, a down bar 13, an upright seat bar 14 and a front stem 25, which is inserted said head sleeve tube 12 therein and connected with an upper steering handle 26 and a lower front folk 27 together with a front wheel 28; Disposed pivotally in a lower joint of the down bar 13 and upright seat bar 14 are a front sprocket wheel 20 and a pair of pedals 21, 22, which are used to drive the front sprocket wheel 20, meanwhile a rear sprocket wheel 19 is disposed pivotally in hub of rear wheel 18 so that both of the front sprocket wheel 20 and rear sprocket wheel 19 are linked by a chain 24 in engagement manner; An adjustable extended bar 15 with a saddle 16 at its end is inserted in the upright seat bar 14, which backwardly connects a rear folk 17 together with a rear wheel 18 at the lower end of the rear folk 17; On each end of the upper handle 26, a brake lever 101 for rear wheel and another brake lever 102 for front wheel are disposed thereon respectively;

Said auxiliary cycle body 8, which does not have a front folk 27 and a front wheel 28, still has a cross top bar 81, a head sleeve tube 82, a down bar 83, a front stem 821, which is inserted in the head sleeve tube 82 and connected with a holding handle 822, an extended bar 85 with a saddle 86 being inserted an upright seat bar 84 therein, a rear folk 87 with a rear wheel 88 and a pair of pedals 891 as well as a front sprocket wheel 20 (not shown in the figure) and a rear sprocket wheel 89 being engaged by a chain 890;

Said front articulation mechanism 5, please also refer to the associated FIGS. 1 through 3, has a first linking terminal 51, a second linking terminal 52 and a pair of parallel linking rods 6, 7, wherein, said second linking terminal 52 is securely fixed with a linking block 80 on the head sleeve tube 82 of the auxiliary cycle body 8 by a pair of bolts 841 running through a pair of positioning hole 800 on the linking block 80 and corresponding pair of round bores 540 on the second linking terminal 52 meanwhile said first linking terminal 51 is securely fixed with a linking block 10 on the head sleeve tube 12 of the primary bicycle body 1 by a pair of bolts (not shown in the figures) in the same manner; For each of the first linking terminal 51 and second linking terminal 52, a linking mount 53 and a linking mount 54 are formed respectively, wherein, a single holding base 55, 56, 57 or 58 with its holding cavity 550, 560, 570 or 580 is individually disposed on each top and lower section sides thereof in opposed facing manner; For each opposed facing side of the diagonal mating holding base 55 and holding base 58, each pair of positioning holes 551, 552 and positioning holes 581, 582 are preset for being selectively connected by an elastic element 3 meanwhile each opposed facing side of the diagonal mating holding base 57 and holding base 56, each pair of positioning holes 571, 572 and positioning holes 561, 562 are preset for being selectively connected by another elastic element 4 in the same manner (see FIG. 5); For each pair of directly facing holding cavity 550 of the holding base 55 and holding cavity 560 of the holding base 56 as well as holding cavity 570 of the holding base 57 and holding cavity 580 of the holding base 58, each linking rod 6 and linking rod 7 is respectively pivoted therein in parallel manner.

Figure 5:
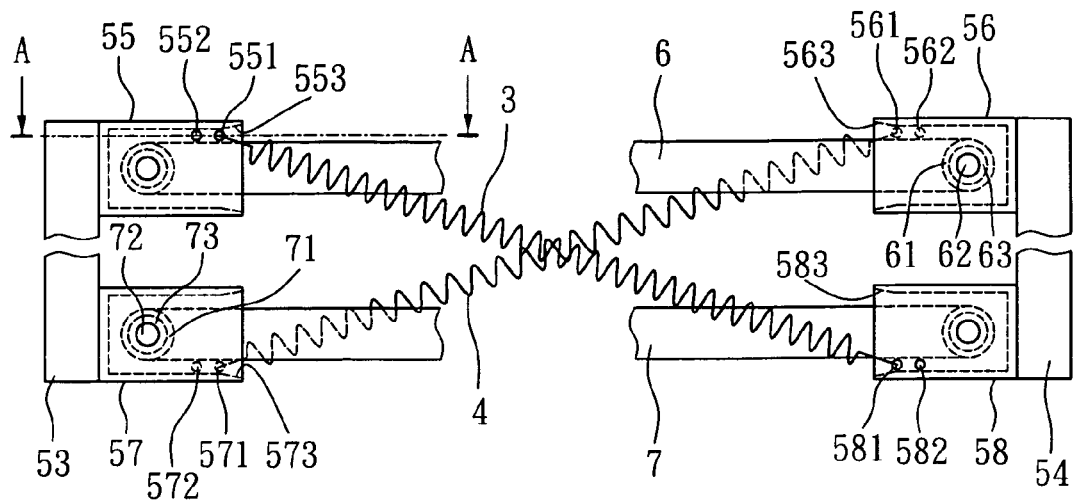
FIG. 5 is the lateral structural view of the front articulation mechanism for the present invention.
Figure 6:
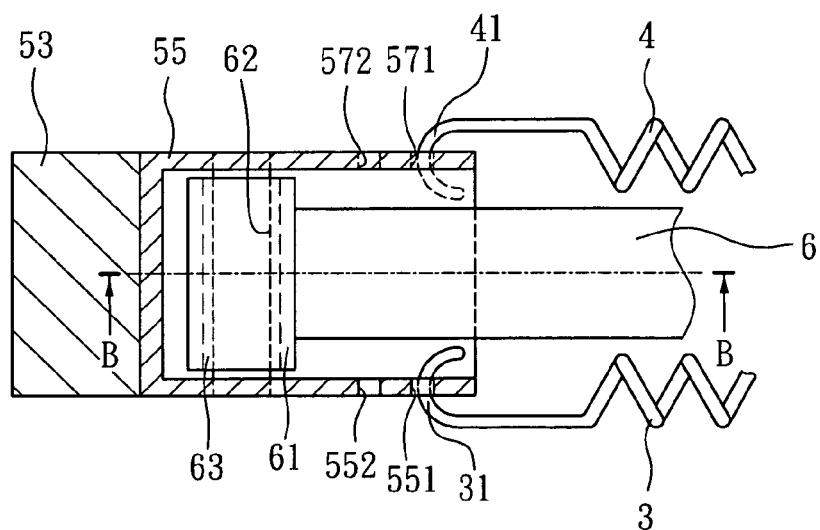
FIG. 6 is the cross section view taken along the section line A-A from the previous FIG. 5.
Figure 7:
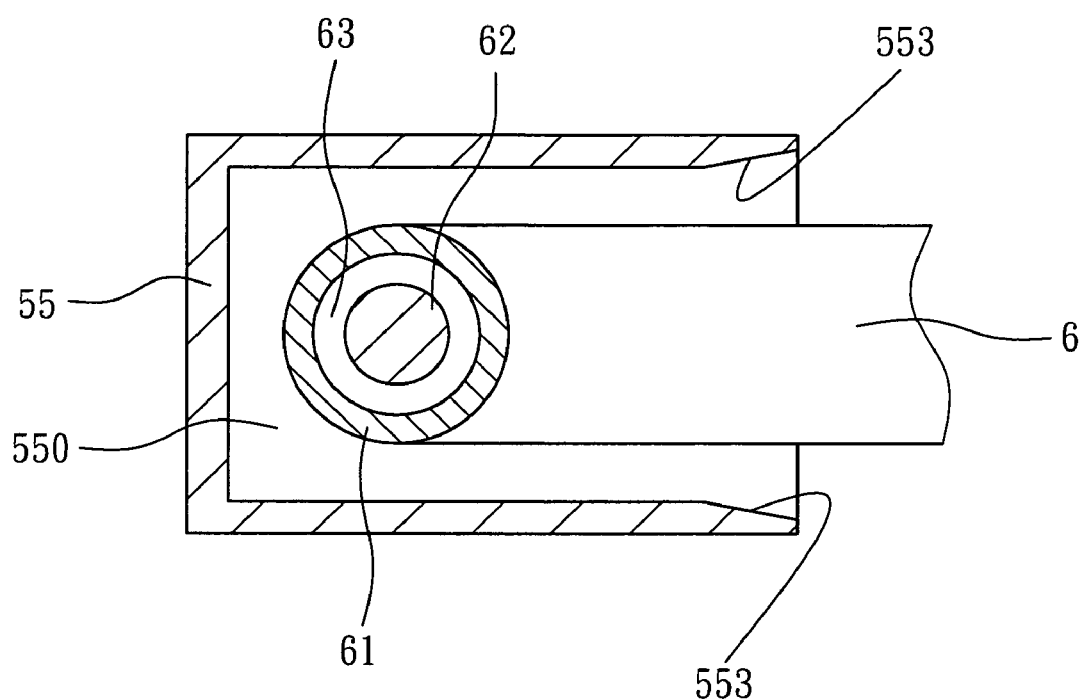
FIG. 7 is the cross section structural view showing the combination of linking mounts with linking rods for the front articulation mechanism of the present invention.

Please refer to FIGS. 3, 5 and 6. A resilient tension mechanism comprises two elastic elements 3, 4 in diagonal and separated crossing manner, wherein, an end hook 31 is formed in each of both ends for the elastic element 3 individually for clasping a positioning hole 551 of the holding cavity 550 and a positioning hole 581 of the holding cavity 580 such that the elastic element 3 is located one lateral side of the pair of parallel linking rods 6, 7, meanwhile an end hook 41 is formed in each of both ends for the elastic element 4 individually for clasping a positioning hole 571 of the holding cavity 570 and a positioning hole 561 of the holding cavity 560 such that the elastic element 4 is located another lateral side of the pair of parallel linking rods 6, 7; Thus, said elastic element 4 and elastic element 3 are arranged in manner of diagonally and separately crossing each other at different lateral side of the pair of parallel linking rods 6, 7 as shown in the FIG. 5;

For the elastic elements 3, 4 of the present invention, not only the strong springs of alternative different high elasticity coefficients can be used for options but also the different combination of positioning holes for clasping the pair of end hooks 31, 41 such as positioning holes 552; 562; 572 and 582 can be adopted instead of original said positioning hole 551, 561, 571 and 581 to adjust the resilience of the elastic elements 3, 4 so that the auxiliary cycle body 8 can be maintained in stable level without any inclination in forward or backward manner;

Please refer to FIGS. 3 and 5 through 7. For each end of the parallel linking rods 6, 7, a shaft bore 51, 61 and a shaft bore 71, 81 is transversely disposed thereon for accommodating corresponding linking shaft 52, 62 and linking shaft 72, 82 with tolerance of ring gap 53, 63 and ring gap 73, 83 as each outer diameter of the shaft bore 51, 61 and a shaft bore 71, 81 is slightly bigger than that of the linking shaft 52, 62 and linking shaft 72, 82 so that the linking rods 6, 7 can be moved smoothly with such tolerance.

Figure 8:
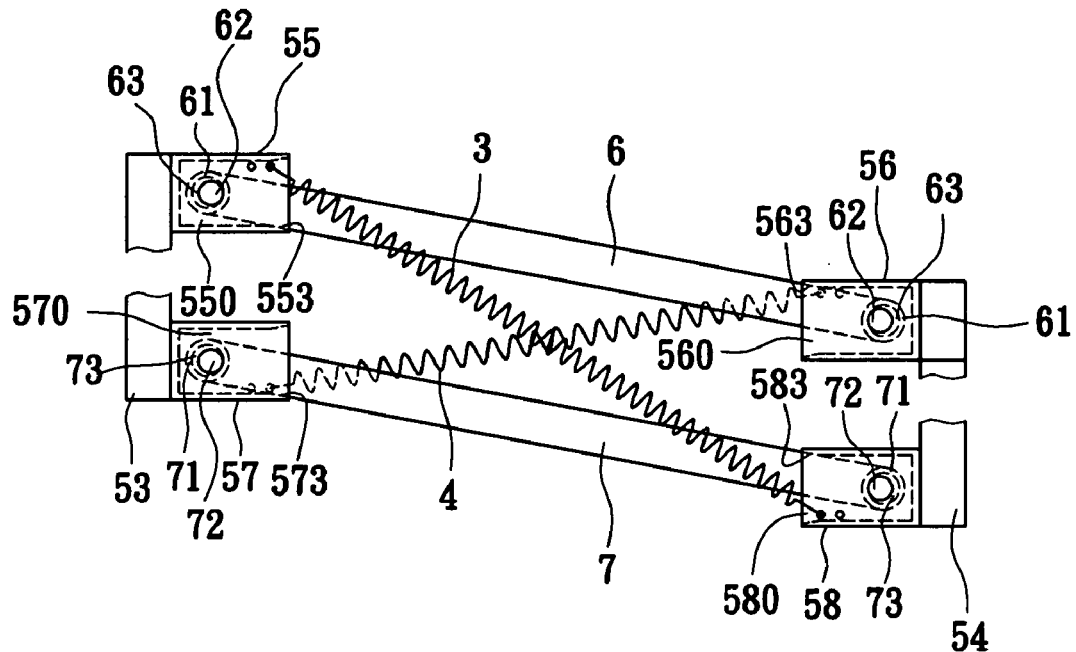
FIG. 8 is the operational view showing the acting status of the front articulation mechanism for the tricycle of the present invention passing over the bumpy road.
Figure 9:
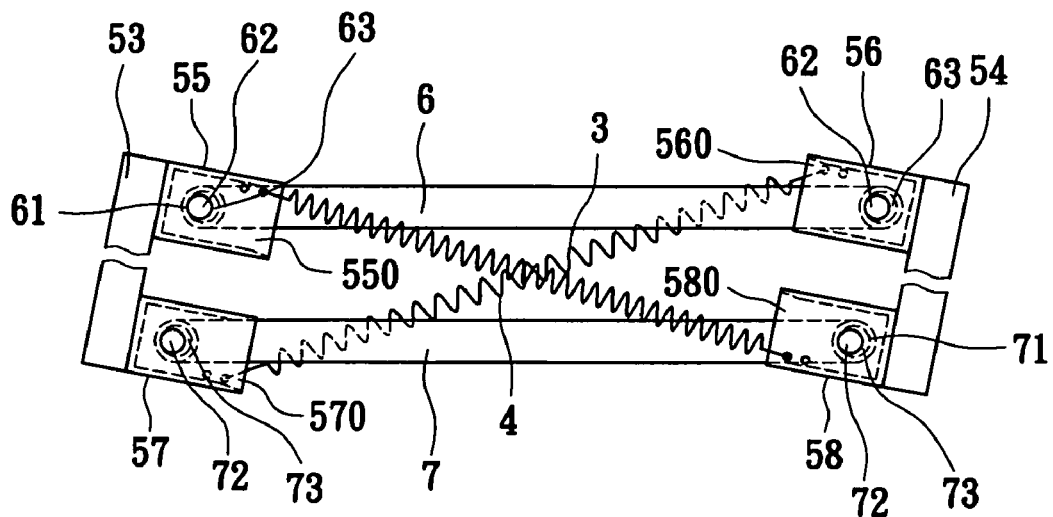
FIG. 9 is the operational view showing the acting status of the front articulation mechanism for the tricycle of the present invention during right turn.

Please refer to the FIG. 8. When the tricycle of the present invention drives over the uneven and bumpy road with certain drop height such as the road surface under the auxiliary cycle body 8 being lower that of the primary bicycle body 1, the right end of the parallel linking rods 6, 7 will slant downwards in certain degree to offset the drop height incurred by the joint of linking mounts 54 on the second linking terminal 52 of the front articulation mechanism 5 with auxiliary cycle body 8 as well as the tolerance of the ring gaps 63, 73 at the pivotal joints of the parallel linking rods 6, 7 because the integral front articulation mechanism 5 is a parallelogram, which keeps two pair of opposed sides always in parallel even under relative shift disposition or movement; Thereby, both of the auxiliary cycle body 8 and primary bicycle body 1 are maintained in stable level and linked movement manner without inclined phenomena or tumbling trend. Besides, the relative shift disposition or movement of the two pair of opposed sides for the parallelogram of the integral front articulation mechanism 5 will make the elastic element 3 stretch and the elastic element 4 compress so that the resilient forces of the stretched elastic element 3 and the compressed elastic element 4 will reactively assist to keep the tricycle in stable linkage. Similarly, when the tricycle of the present invention drives to left turn, the reaction situation of the integral front articulation mechanism 5 is shown as in the FIG. 8; Likewise, when the tricycle of the present invention drives to right turn, the reaction situation of the integral front articulation mechanism 5 is shown as in the FIG. 9, which resembles the previous disclosure with change of the right and left sides; Accordingly, the detailed description for both left turn and right are saved without redundant disclosure.

Thus, when the tricycle of the present invention drives over the uneven and bumpy road with certain drop height and drives to make left or right turn, the parallelogram synergy of parallel linking rods 6, 7, linking mounts 53, 54 for the integral front articulation mechanism 5, which is just like an smoothly movable articulated joint, and the movement confinement of the parallel linking rods 6, 7 limited by the cambered confining ends 553, 563, 573, 583 on the holding cavity 550, 560, 570, 580 not only make both of the auxiliary cycle body 8 and primary bicycle body 1 in automatically balanced coordination but also prevent the tricycle of the present invention from overturning or tumbling.

The parallel linking rods 6, 7 of the present invention can be made of steel pipe, and the holding bases 55, 56, 57, 58 are also made of rigid material; In order to enlarge the contacting area between both ends of the parallel linking rods 6, 7 and the holding bases 55, 56, 57, 58 for avoiding strain due to exceeding stress, each internal opening rim of the holding cavities 550, 560, 570, 580 can be formed into cambered confining end 553, 563, 573, 583 as shown in the FIG. 7.

Figure 4:
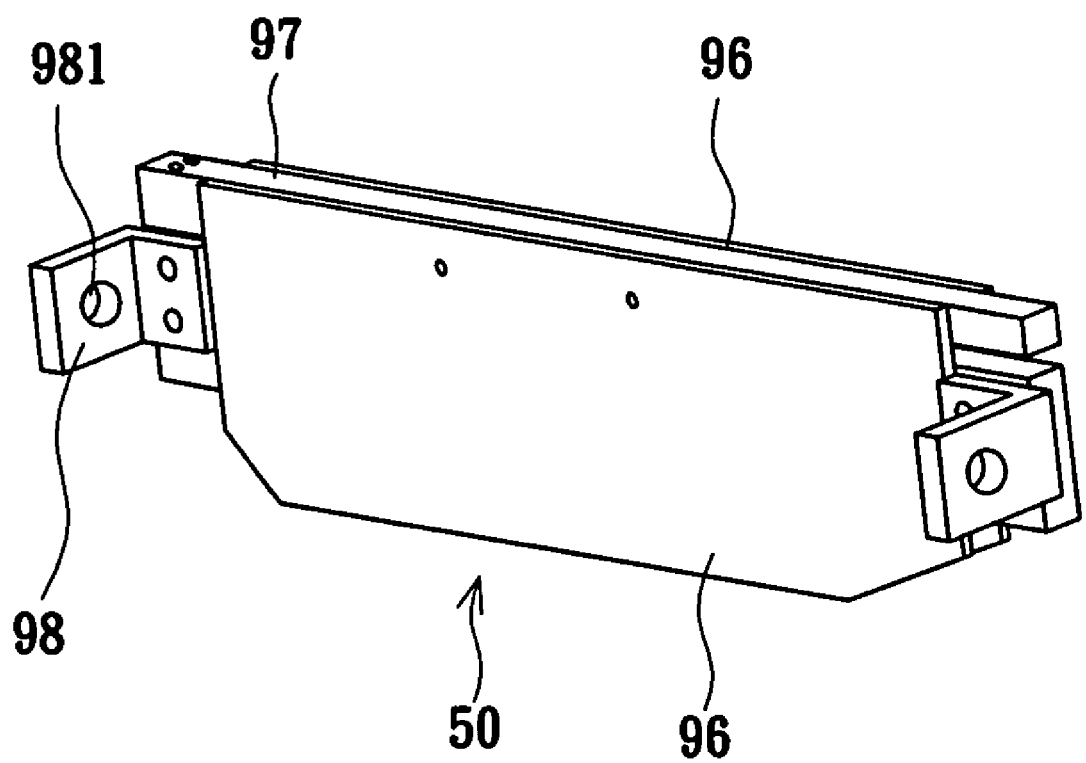
FIG. 4 is the assembly appearance view of the rear articulation mechanism for the present invention.

Said rear articulation mechanism 50, whose structure is almost like that of the front articulation mechanism 5, is used to link both breech sections such as hubs 180, 880 of the rear wheels 18, 88 for the primary bicycle body 1 and auxiliary cycle body 8. Please refer to the FIGS. 1 and 4. The first linking terminal and second linking terminal of the rear articulation mechanism 50 is respectively linked and securely fixed on hub 180, 880 of the rear wheel 18, 88 for the primary bicycle body 1 and auxiliary cycle body 8 individually by each fixing peg 95 running through each round bore 981 of each linking mount 98. Thus, by means of both of the front articulation mechanism 5 and rear articulation mechanism 50, the dual riding and driving tricycle in juxtaposing link of the present invention not only provides smooth coordination during advance driving action but also enhances the integral stability in linking synergy for both of the primary bicycle body 1 and auxiliary cycle body 8.

Please refer to FIG. 3. In order to prevent dust from entering the front articulation mechanism 5 and rear articulation mechanism 50, or to avoid driver from risk incurred thereby, a side panel 91 is firmly fixed with a top plate 92 at one flank by running a bolt 93 through a round bore 911 of the side panel 91 and a positioning hole 922 of the top plate 92; Similarly, another side panel 91 is firmly fixed with same top plate 92 at another flank by the same token; Thus, the parallel linking rods 6, 7 and elastic elements 3, 4 are concealed instead of exposure. Only one end of said top plate 92 with a pair of positioning holes 921 is securely fixed on the linking mount 53 by running a bolt 94 through the positioning holes 921 of the top plate 92 and round bores 531 of the linking mount 53 while the other end of said top plate 92 is free of any fixation therewith so that the concealing effect for the parallel linking rods 6, 7 is achievable thereby but without hindrance for the entire function and movement of the front articulation mechanism 5. Likewise, two side panels 96 and one top plate 97 are additionally disposed with the rear articulation mechanism 50 for same purpose in same manner as shown in the FIG. 4.

In order to have safety assurance, each of three wheels in the dual riding and driving tricycle in juxtaposing link of the present invention is equipped with brake respectively; Because of two rear wheels 18, 88, a rear wheel brake wire 29, which is driven by the rear wheel brake lever 101 of the primary bicycle body 1, is imparted into two shunt brake wires 291, 292 for connecting with brake for rear wheel 18 of the primary bicycle body 1 and brake for rear wheel 88 of the auxiliary cycle body 8 respectively (not shown in the figures), while a front wheel brake wire 23, which is driven by the front wheel brake lever 102 of the primary bicycle body 1, is only used for connecting with brake for single front wheel 28 of the primary bicycle body 1 as no front wheel is disposed on the auxiliary cycle body 8 (not shown in the figures). Each of the steering handle 26 on the primary bicycle body 1 and holding handle 822 on the auxiliary cycle body 8 is provided with height adjuster respectively, which is not described here in redundant manner as it is a well-known technology.

Because the one front wheel 28 and one rear wheel 18 from the primary bicycle body 1 plus one rear wheel 88 from the auxiliary cycle body 8 construct a triangular base for the integral dual riding and driving tricycle in juxtaposing link of the present invention, the tricycle riders with tricycle will be kept in stable status without any possibility of tumbling situation owing to the weight center being maintained in the internal area of the triangular base; Besides, the height adjusters on the extended bars 15, 85 are also served to alter the approaching distance between the saddles 16, 86 and the rear wheel 18, 88 other than the heights of the saddles 16, 86 so that the integral dual riding and driving tricycle in juxtaposing link of the present invention features to have better stability and comfort for the riders.

Figure 11:
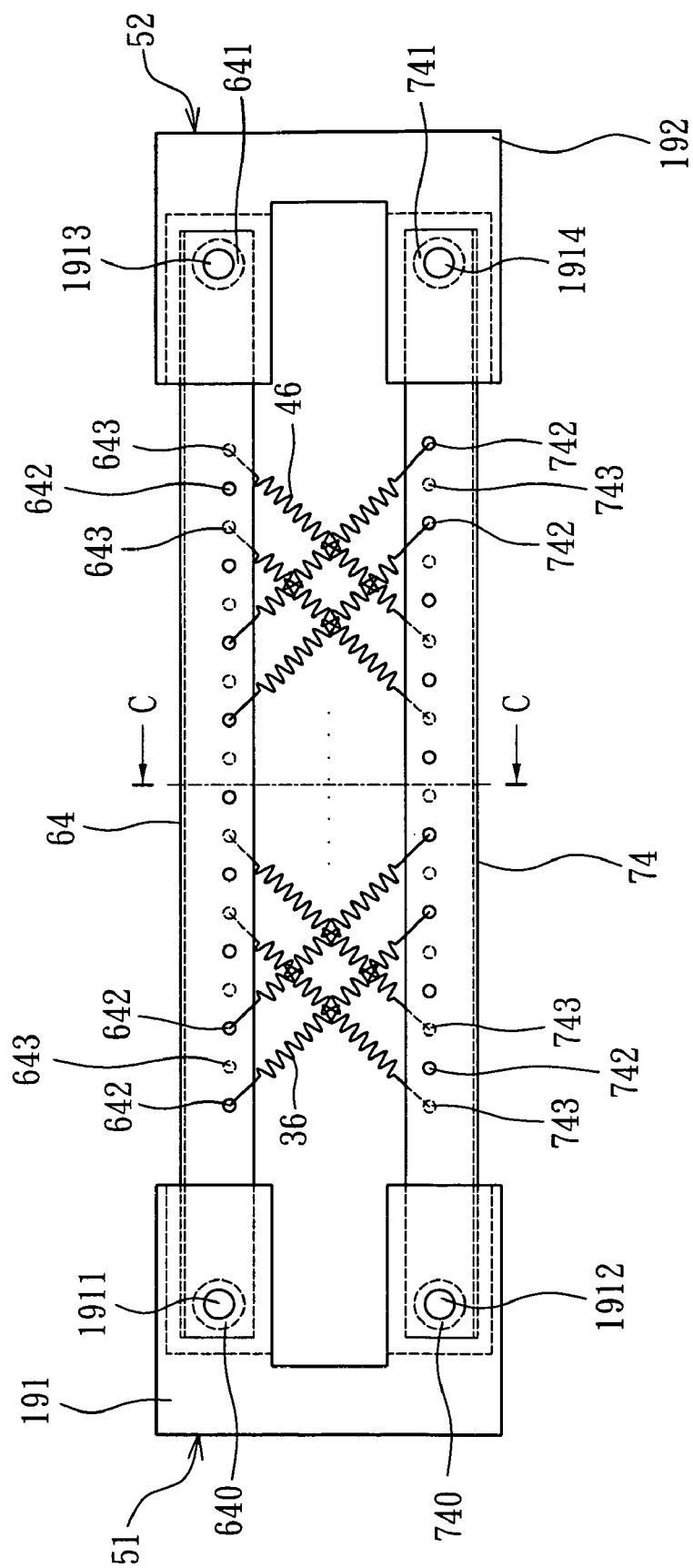
FIG. 11 is the structural schematic view showing alternative front articulation mechanism for another exemplary embodiment of the present invention.
Figure 12:
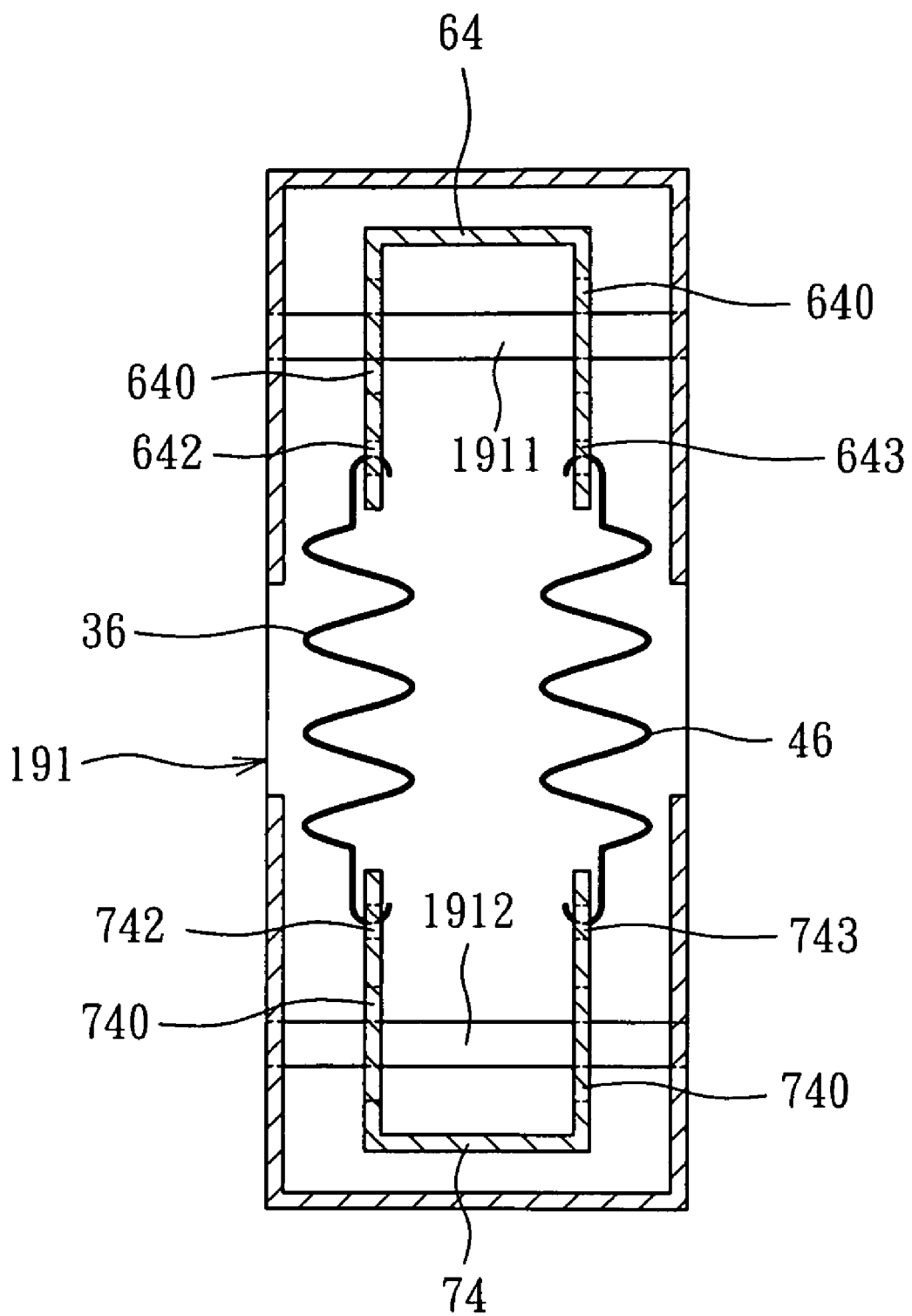
FIG. 12 is the left lateral view of the FIG. 11 for the present invention.

Please refer to FIGS. 11 and 12, which are the structural schematic views showing alternative front and rear articulation mechanisms 5, 50 for another exemplary embodiment of the present invention, wherein the original pair of parallel linking rods 6, 7 are replaced by a pair of parallel trough linking steel beams 64, 74, each of which is formed into ⊓-shaped transverse cross section. Accordingly, the modified front articulation mechanism in this exemplary embodiment comprises a pair of parallel trough linking steel beams 64, 74 with first linking terminal 51, a mount 191 serving as first linking terminal 51 for jointing with the primary bicycle body 1, another mount 192 serving as second linking terminal 52 for jointing with the auxiliary cycle body 8 and a resilient tension mechanism, wherein, both ends of each said pair of parallel trough linking steel beams 64, 74 are securely fixed on the pair of mounts 191, 192 individually by running shafts 1911, 1913 and shafts 1912, 1914 through positioning holes 640, 641 and positioning holes 740, 741 on the parallel trough linking steel beams 64, 74 respectively; Thereby, the pair of parallel trough linking steel beams 64, 74 and pair of mounts 191, 192 construct a free moving parallelogram articulation;

For said resilient tension mechanism, plural even-spaced positioning holes 642, 742; 643, 743 are created in both lateral sides of the trough linking steel beams 64, 74; For each side of the trough linking steel beams 64, 74, plural springs 36 and springs 46 in array are selectively clasped to the positioning holes 642, 742 and positioning holes 643, 743 by end hooks in different diagonal manner so that each array springs 36 and array springs 46 on both sides of the trough linking steel beams 64, 74 are arranged in manner of diagonally and separately crossing each other; Thereby, the integral counteractive resilience of the diagonal crossed springs 36, 46 will be strong enough to maintain the tricycle of the present invention in stable state; The number and linking inclined angle against the trough linking steel beams 64, 74 of the springs 36, 46 can be arbitrarily changed in accordance with the weight or preference of the rider to make the tricycle more practicable.

To comprehensively outlook the tricycle of the present invention, each of the primary bicycle body 1 and auxiliary cycle body 8, which are linked in juxtaposition by the front articulation mechanism 5 and rear articulation mechanism 50, has its individual driving pedals respectively so that two drivers can enjoy the cycling recreation in juxtaposition; Thus, the tricycle is not only easily kept in stable and unable to tumble or overturn during corner turn but also naturally kept in stand well without driver's foot to support in assistance manner when in standstill state.

We claim:

1. A dual riding and driving tricycle, comprising:
    a primary bicycle body including a front wheel, a rear wheel, a saddle for a rider to sit thereon, a steering handle for controlling a driving direction and a pair of pedals for the rider to power the primary bicycle body;
    an auxiliary cycle body includes a wheel, a saddle for an auxiliary driver to sit thereon, and a pair of pedals for powering the auxiliary cycle body;
    at least one articulation mechanism including a first linking terminal for coupling with the primary bicycle body, a second linking terminal for coupling with the auxiliary cycle body and a pair of parallel linking rods arranged such that the first linking terminal, the second linking terminal and the two parallel linking rods construct a parallelogram articulation; and
    a resilient tension mechanism including at least two elastic elements such that both ends of each said elastic element are respectively connected to the articulation mechanism.

2. The tricycle as claimed in claim 1, wherein each of the first linking terminal and the second linking terminal respectively comprises a linking mount, each linking mount including a pair of holding bases, the holding bases of the first linking terminal opposingly facing the holding bases of the second linking terminal, wherein the pair of parallel linking rods are pivotally connected to the holding bases of the first linking terminal and the holding bases of the second linking terminal.

3. The tricycle as claimed in claim 2, wherein each pair of holding bases includes an upper holding base and a lower holding base, at least one positioning hole being formed in each of the upper holding bases and each of the lower holding bases,
    wherein one of the two elastic elements has two ends respectively connected to the positioning hole in the upper holding base of the linking mount of the first linking terminal and the positioning hole in the lower holding base of the linking mount of the second linking terminal, and the other one of the two elastic elements has two ends respectively connected to the positioning hole in the lower holding base of the linking mount of the first linking terminal and the positioning hole in the upper holding base of the linking mount of the second linking terminal.

4. The tricycle as claimed in claim 1, wherein the elastic elements are springs having different elasticity coefficients.

5. The tricycle as claimed in claim 1, wherein the at least one articulation mechanism includes a front articulation mechanism, wherein the first linking terminal of the front articulation mechanism is securely fixed to the primary bicycle body between the front wheel and the rear wheel and the second linking terminal of the front articulation mechanism is securely fixed to a front portion of the auxiliary cycle body.

6. The tricycle as claimed in claim 5, wherein the at least one articulation mechanism includes a rear articulation mechanism, wherein the first linking terminal of the rear articulation mechanism is securely fixed to the primary bicycle body and the second linking terminal of the rear articulation mechanism is securely fixed to the auxiliary cycle body.

7. The tricycle as claimed in claim 6, wherein the first linking terminal of the rear articulation mechanism and the second linking terminal of the rear articulation mechanism are respectively linked and securely fixed on a hub of the rear wheel of the primary bicycle body and a hub of the wheel of the auxiliary cycle body.

8. The tricycle as claimed in claim 1, further comprising:
    a top plate having a first end fixed to one of the first and second linking terminals and a second end free of fixation to either of the first and second linking terminals; and
    two side panels respectively fixed to opposing lateral sides of the top plate such that a hollow space is formed for accommodating the linking rods of the articulation mechanism and the elastic elements of the resilient tension mechanism.

9. A dual riding and driving tricycle, comprising:
    a primary bicycle body including a front wheel, a rear wheel, a saddle for a rider to sit thereon, a steering handle for controlling a driving direction and a pair of pedals for the rider to power the primary bicycle body;
    an auxiliary cycle body includes a wheel, a saddle for an auxiliary driver to sit thereon, and a pair of pedals for powering the auxiliary cycle body;
    at least one articulation mechanism including a first linking terminal for coupling with the primary bicycle body, a second linking terminal for coupling with the auxiliary cycle body and a pair of parallel trough linking steel beams arranged such that the first linking terminal, the second linking terminal and the two parallel trough linking steel beams construct a parallelogram articulation; and
    a resilient tension mechanism including at least two elastic elements such that both ends of each said elastic element are respectively connected to the articulation mechanism.

10. The tricycle as claimed in claim 9, wherein each of the parallel trough linking steel beams has an inverse U-shaped transverse cross section, each of the parallel trough linking steel beams having two ends respectively fixed to the first linking terminal and the second linking terminal, wherein each of the first linking terminal and the second linking terminal comprises a linking mount respectively coupled to the primary bicycle body and the auxiliary cycle body.

11. The tricycle as claimed in claim 10, wherein a plurality of positioning holes are formed in opposing lateral sides of the trough linking steel beams, and the at least two elastic elements includes a plurality of springs having ends respectively connected to each of the trough linking steel beams.

* * * * *